United States Patent [19]

Lumsden et al.

[11] Patent Number: 4,629,221
[45] Date of Patent: Dec. 16, 1986

[54] PIPE CONNECTORS

[75] Inventors: Norman Lumsden; John D. McGugan, both of Aberdeen, Scotland

[73] Assignee: Hunting Oilfield Services (UK) Ltd., Aberdeen, Scotland

[21] Appl. No.: 596,526

[22] Filed: Apr. 4, 1984

[30] Foreign Application Priority Data

Apr. 5, 1983 [GB] United Kingdom ............... 8309248
Nov. 29, 1983 [GB] United Kingdom ............... 8331839

[51] Int. Cl.$^4$ ............................................. F16L 25/00
[52] U.S. Cl. .................................... 285/328; 285/331; 285/334; 285/381; 285/921; 285/351
[58] Field of Search ............ 285/333, 334, 332, 332.2, 285/332.4, 331, 921, 381, 328, 351

[56] References Cited

U.S. PATENT DOCUMENTS

| | | | |
|---|---|---|---|
| 1,913,246 | 6/1933 | Suine | 285/334.4 |
| 2,258,066 | 10/1941 | Oyen | 285/334.4 X |
| 3,114,566 | 12/1963 | Coberly et al. | 285/334 X |
| 3,338,596 | 8/1967 | Knox | 285/332.2 X |
| 3,667,784 | 6/1972 | Hokanson et al. | 285/334 X |
| 4,525,001 | 6/1985 | Lumsden et al. | 285/331 |

FOREIGN PATENT DOCUMENTS

| | | | |
|---|---|---|---|
| 3207180 | 7/1983 | Fed. Rep. of Germany | 285/332 |
| 103496 | 5/1924 | Switzerland | 285/334.4 |
| 289780 | 6/1976 | U.S.S.R. | 285/332 |

*Primary Examiner*—Dave W. Arola
*Attorney, Agent, or Firm*—Watson, Cole, Grindle & Watson

[57] ABSTRACT

A pipe connector comprises a tubular pin member having an outer generally frusto-conical peripheral surface provided with annular projections, and a tubular box member having an inner peripheral surface corresponding to the peripheral surface of the pin member, which overlies the peripheral surface of the pin member when the members are fully engaged together, and is provided with annular grooves in which the projections on the pin member are engaged. At the inner end of the peripheral surface of the pin member, the pin member is provided with an annular projection extending in the direction of the free end thereof, overlying the peripheral surface thereof and providing a first radially outer radial surface portion and a second radially inner radially inwardly directed surface portion. The free end of the box member is provided with corresponding radial and radially outwardly directed surface portions. A corresponding projection is provided at the inner end of the peripheral surface of the box member with corresponding radial and radially outwardly directed surface portions, the free end of the pin member being provided with corresponding radial and radially inwardly directed surface portions. The pairs of radially inwardly and outwardly directed surface portions are in contact when the pin and box members are fully engaged together, and one of the pairs of radial surfaces are in contact when the members are fully engaged together.

39 Claims, 14 Drawing Figures

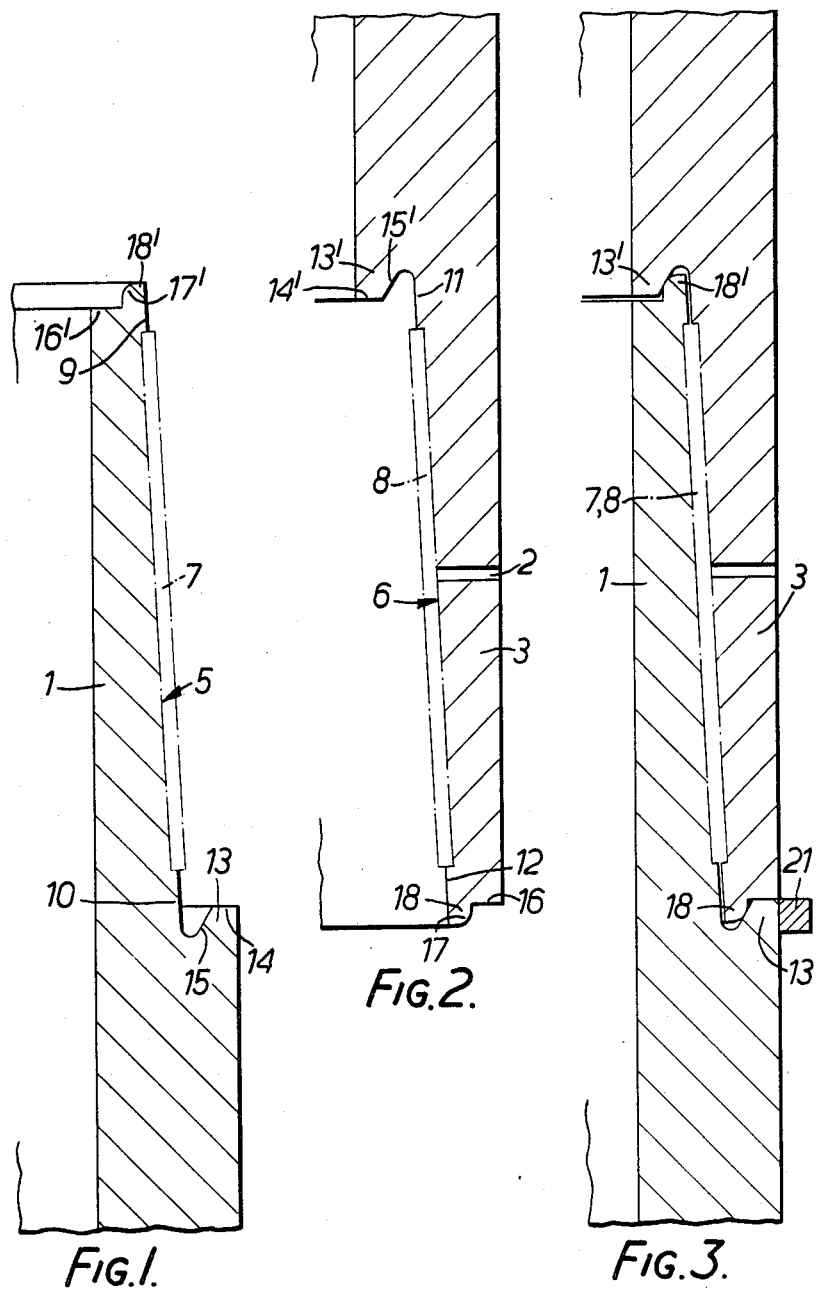

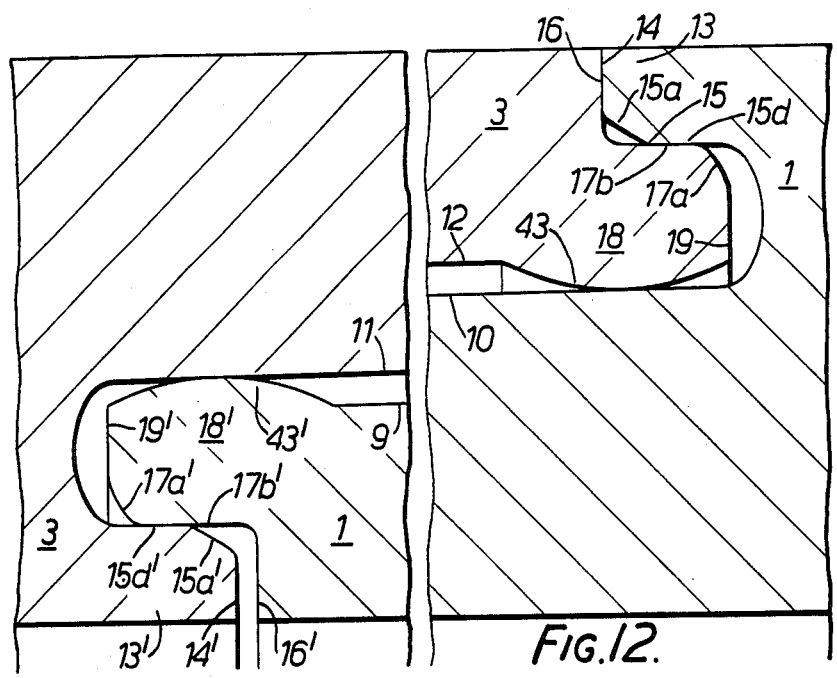
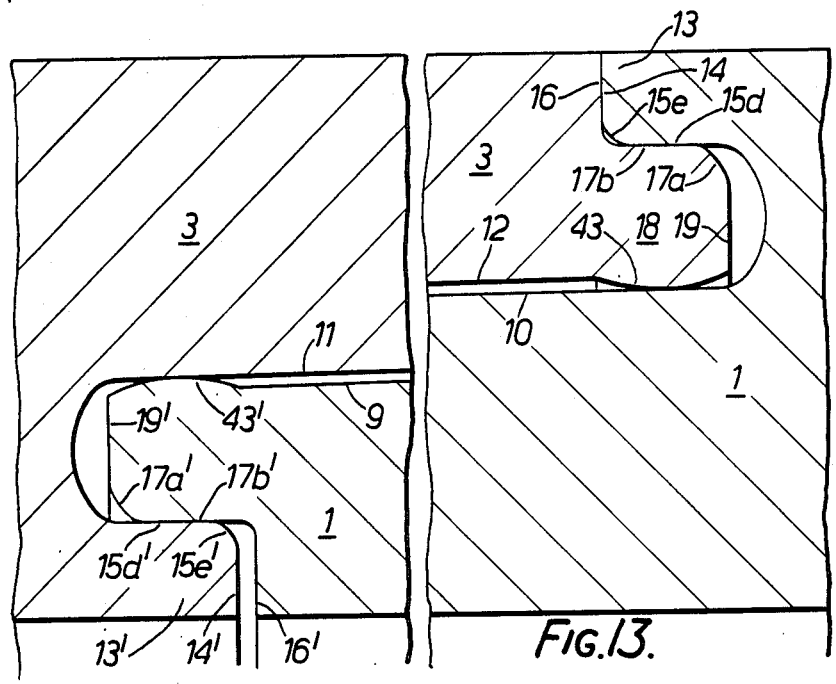

PIPE CONNECTORS

The present invention relates to pipe connectors for use in connecting pipe sections of a pipe.

The invention has particular application to pipe connectors of the type described for example in British Patent Specifications Nos. 1573945, 2033518 and 2113335, in which the pipe connector comprises a tubular pin member having a frusto-conical outer peripheral surface and a tubular box member having a frusto-conical inner peripheral surface corresponding to the outer peripheral surface of the pin member and which overlies the outer surface of the pin member when the members are fully engaged together. In use, the two members are telescoped together and are axially locked together by inter-engagable annular projections and grooves provided on the peripheral surfaces, the projections and grooves being spaced apart along the length of the two surfaces.

In telescoping the two members together, the members are initially telescoped until surface contact is made between portions of the frusto-conical peripheral surfaces of the members to provide seals. Fluid under pressure is then preferably supplied between the members to expand the box member and/or contract the pin member, while at the same time an axial force is applied to the members to bring them together so that corresponding ones of the projections and grooves inter-engage. To disengage the members, fluid under pressure is again supplied between the members to expand the box member and/or contract the pin member to progressively bring the projections out of the grooves and so permit the members to be moved axially apart. However for the pressurised fluid to be effective, seals must be maintained at both ends of the overlapped frusto-conical surfaces. It has been found that if there is any tendency in either of the two members to deviate from a circular cross section during this expansion/contraction, the resulting ovality of the members will effectively break the seal so that the pressure of the fluid is dissipated and the members cannot then be disengaged.

Additionally, particularly where the pipe is used to convey pressurised fluid, sealing needs to be provided between the members of the connector to prevent leakage of the fluid, and, particularly for use in a pressurised ambient fluid, for example under water, sealing needs to be provided between the connectors to prevent ingress of ambient fluid.

SUMMARY OF THE INVENTION

According to the present invention there is provided a pipe connector comprising a tubular pin member having a generally frusto-conical outer peripheral surface and a tubular box member having a generally frusto-conical inner peripheral surface corresponding to the frusto-conical outer peripheral surface of the pin member and which overlies the outer peripheral surface of the pin member when the members are fully engaged together, the frusto-conical surfaces being provided with annular projections and grooves which are inter-engagable when the members are fully engaged together to axially lock the members together, wherein one of the members is provided with an annular projection extending about the inner end of the peripheral surface thereof and projecting in the direction of the free end of the one member, the projection having a first annular end surface portion which is generally radial and a second annular end surface portion which is generally radially directed, which faces the peripheral surface thereof, and which lies between the first surface portion and the peripheral surface thereof, the free end of the other member having a first annular end surface portion which is generally radial and contacts the first end surface portion of the projection when the members are fully engaged together, and a second annular generally radially directed end surface portion which faces and laterally contacts the second end surface portion of the projection when the members are fully engaged together. The one member may be the pin member or the box member.

The second surface portion of the one member may be generally frusto-conical and inclined in a direction opposite to that of the frusto-conical peripheral surface thereof. For example, it may be frusto-conical or may include two frusto-conical parts having different conicities, or a first frusto-conical or radiussed part and a second generally cylindrical part.

The second surface portion of the other member may comprise a radiussed part which contacts the second surface portion of the one member as the pin and box members are engaged together and which may form the part contacting the second surface portion of the one member when the members are fully engaged together. Alternatively, the second surface portion of the other member may be generally frusto-conical corresponding to a generally frusto-conical part of the second surface portion of the one member which it contacts when the members are fully engaged together.

In one embodiment, the second surface portion of the one member comprises a first frusto-conical or radiussed part between the first surface portion and a second cylindrical part, and the second surface portion of the other member comprises a radiussed part which initially contacts the first part of the second surface portion of the one member and which is connected by a cylindrical part to the first surface portion of the other member, the cylindrical part of the other member laterally contacting the cylindrical part of the one member when the members are fully engaged together.

Where the pipe connector is to be used for connecting pipe sections to be subject to axial forces, for example in pile driving, the first surface portions are in force fit abutment so that axial forces can be transmitted through them, this abutment between the first surface portions is maintained by appropriate dimensioning of the inter-engagable projections and grooves in the peripheral surfaces of the members.

Advantageously the second surface portions of the members are in force fit abutment when the members are fully engaged together so as to create an annular seal therebetween, the seal being effective both in use and during disengagement of the members.

The free end of the one member and the inner end of the peripheral surface of the other member may be similarly provided with first and second surfaces, the second surfaces being in lateral contact when the pin and box members are fully engaged together but the first surfaces are axially spaced apart.

The peripheral surfaces of the members in the region of the first and second surfaces are not provided with projections and grooves, may be radially spaced apart, and may be frusto-conical with the same or a different conicity to that of the rest of the peripheral surfaces, or may be cylindrical, or one may be cylindrical and the other frusto-conical.

Sealing means for sealing between the members may be provided. The sealing means may comprise an annular resiliently compressible member which is provided in the recess between the projection on the one member and the body of the one member for engagement by the free end of the other member. A similar annular resiliently compressible seal may be provided at the inner end of the other member for engagement by the free end of the one member. Alternatively, a radial projection may be provided in the peripheral surface of one of the members adjacent one or both ends thereof for force fit engagement with the peripheral surface of the other member.

In one embodiment, a radial projection is provided on the peripheral surface of the other member adjacent the free end thereof for sealing engagement with the peripheral surface of the one member in the region of the first and second surface portions thereof, and which is arranged to cause the second surface portion of the other member to be biased into contact with the second surface portion of the one member. A similar radial projection may similarly be provided on the peripheral surface of the one member adjacent the free end thereof.

Embodiments according to the present invention will now be described, by way of example only, with reference to the accompanying drawings.

DESCRIPTION OF THE DRAWINGS

In the drawings:

FIGS. 1 and 2 are part axial sections through the pin member and the box member respectively of an embodiment of a pipe connector according to the present invention;

FIG. 3 is a corresponding part axial section showing the members of FIGS. 1 and 2 engaged;

FIGS. 4 to 13 are diagrammatic part axial sections through embodiments of pin and box members showing modifications thereof.

DETAILED DESCRIPTION OF THE PREFERRED EMBODIMENT

Figure 4:
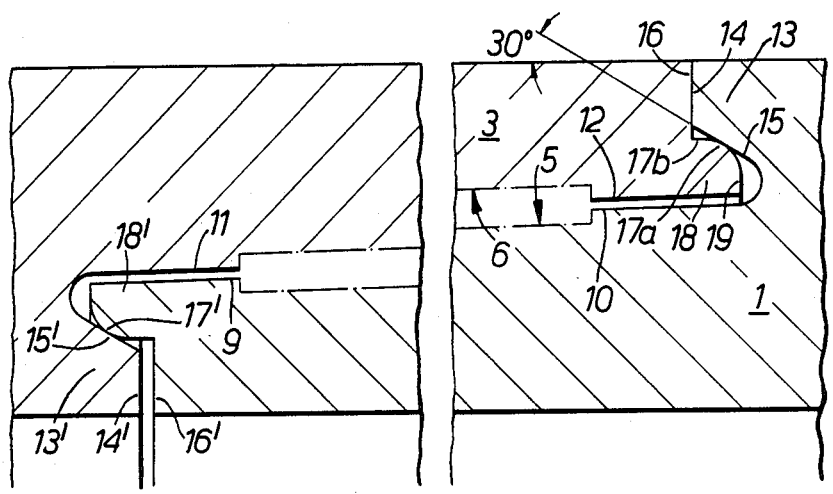

As shown in FIGS. 1 to 3, the pipe connector comprises a tubular pin member 1 for connection to the end of a pipe (not shown), and a tubular box member 3 for connection to the end of a pipe (not shown) to be connected to the pipe connected to the pin member. The pin and box members are telescopically engagable and have generally corresponding, generally frusto-conical outer and inner peripheral surfaces 5,6, respectively, which overlie one another when the pin member is fully engaged with the box member.

To axially lock the pin member relative to the box member when the members are fully engaged, the box member has in its frusto-conical surface 6 a plurality of circumferentially extending, axially spaced annular grooves (or projections), each of which extends in a radial plane. The pin member has corresponding axially spaced, circumferentially extending annular projections (or grooves) corresponding to the grooves (or projections) on the box member. The grooves and projections have not been shown in detail in the drawings but are shown diagrammatically by the broken line regions 7,8 of the surfaces 5,6. The projections and grooves may, for example, be as described in British Patent Specifications Nos. 1573945, 2033518 and 2113335, and reference should be made to the above specifications for a full description of the projections and grooves.

As shown, the projections and grooves 7,8 do not extend the full length of the peripheral surfaces 5,6 which include annular end surface portions 9,10 and 11,12. As shown, these surface portions 9,10,11 and 12 are frusto-conical with the same conicity as the remaining parts of the surfaces 5,6 and extend on surfaces intermediate the surfaces defined by the crest and root surfaces of the projections and grooves. In a modification, surfaces 9 and 12 may extend level with the crests of the projections and surfaces between the grooves, and surfaces 10 and 11 may extend level with the surfaces between the projection and the roots of the grooves, or vice versa. In another modification, the surfaces 9,10,11 and 12 may be cylindrical with diameters corresponding to those of the adjacent ones of the projections and grooves to lie level with or intermediate the crest and root surfaces respectively, as described above. Alternatively the surfaces 10 and 11 may be cylindrical and the surfaces 9 and 12 may be frusto-conical. Where any of the surfaces 9, 10,11 and 12 are frusto-conical, they may, instead of having the same cone angle as the remaining parts of the surfaces, have a slightly larger cone angle than the rest of the surfaces. Advantageously, the surfaces 9 and 11 and 10 and 12 are dimensioned so that, when the members are fully engaged together, they are slightly radially spaced apart or just contacting but are not in contact with a force fit. Where the surfaces are radially spaced apart, one of each pair of surfaces may, as will be described hereafter, be provided with a spherical radius projection which is dimensioned to seal radially against the other of the pair of surfaces.

As described in the above referred to specifications, to facilitate engagement and disengagement of the members, hydraulic fluid is supplied to the overlapped portions of the members via a radial duct 2 in the box member which communicates with an axial groove in the surface 6 of the box member or in both surfaces 5 and 6 of the pin and box members, to cause the fluid to flow throughout the axial extent of the surfaces 5,6 which are provided with projections and grooves.

To disengage the members, the fluid has first to cause expansion of the box member and/or contraction of the pin member to an extent which is sufficient to disengage the projections from the grooves and so permit axial relative movement of the members. During this initial stage of disengagement, there is a tendency for the fluid to flow out from the ends of the surfaces 5,6 as soon as contraction and/or expansion occurs but before the projections and grooves are fully disengaged. If the flow is sufficiently high, the pressure in the fluid will be reduced to an extent that it is no longer possible to disengage the members. Additionally, any tendency of either of the members towards ovality during expansion and/or contraction will make it impossible to disengage the members.

To prevent both the above problems occurring, as shown in the drawings the pin member is provided adjacent the inner or root end of the peripheral surface 5 with an annular projection 13 which projects axially towards the free end of the pin member and surrounds and overlies the end 10 of the peripheral surface 5 of the pin member.

This projection 13 has a first radially outer end surface portion 14 which extends in a generally radial plane and a second radially inner, generally radially inwardly directed end surface portion 15, which, as shown in FIGS. 1 to 3, is generally frusto-conical but with an inclination opposite that of the cone of the surface 5. The free end of the box is provided with a first radially outer end surface portion 16 which extends in a generally radial plane and a second radially inner, generally radially outwardly directed end surface portion 17 which is provided on an annular projection 18 at the free end of the box member.

With the members fully assembled together as shown in FIG. 3, the first surface portions 14 and 16 and the second surface portions 15 and 17 are in contact. Where the pipe connector must be capable of transmitting axial forces, for example for pile driving, the surfaces 14,16 are brought together under a compressive stress, the surfaces being maintained in contact by suitable dimensioning of the projections and grooves in the surfaces 5, 6. Advantageously also, the second surface portions 15, 17 are in force fit abutment to provide a surface-to-surface seal, the seal being effective both in use and during the initial stages of disengagement of the members, as will be described hereafter.

Figure 5:
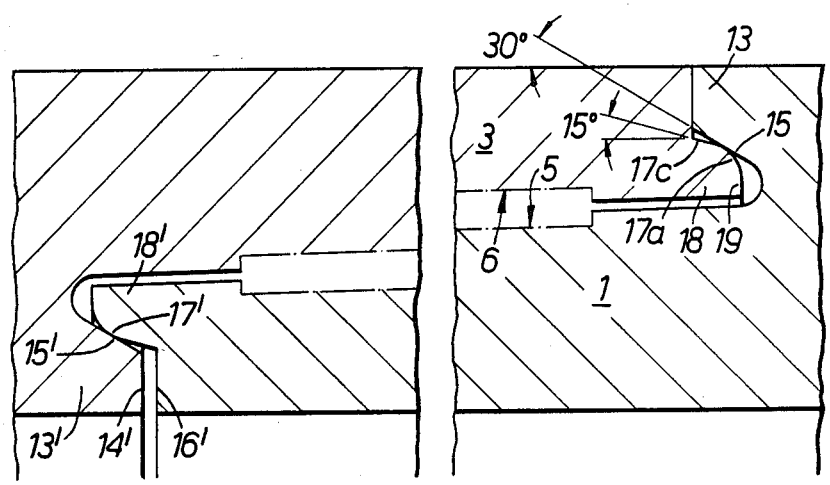
Figure 6:
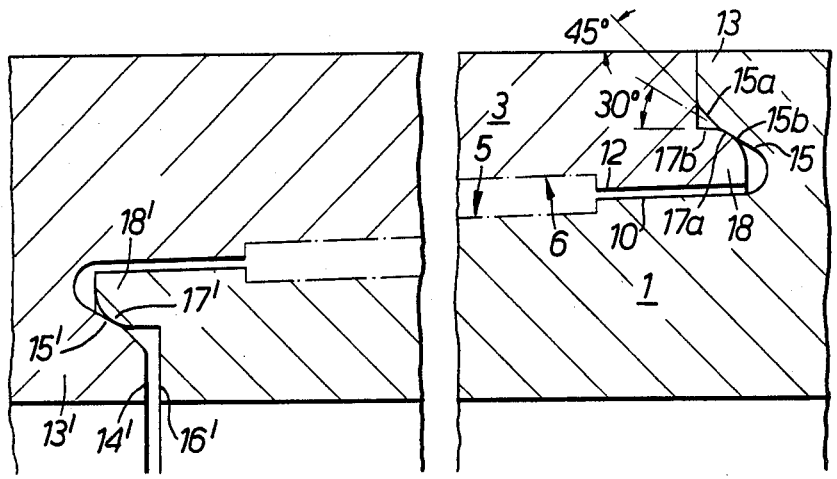
Figure 7:
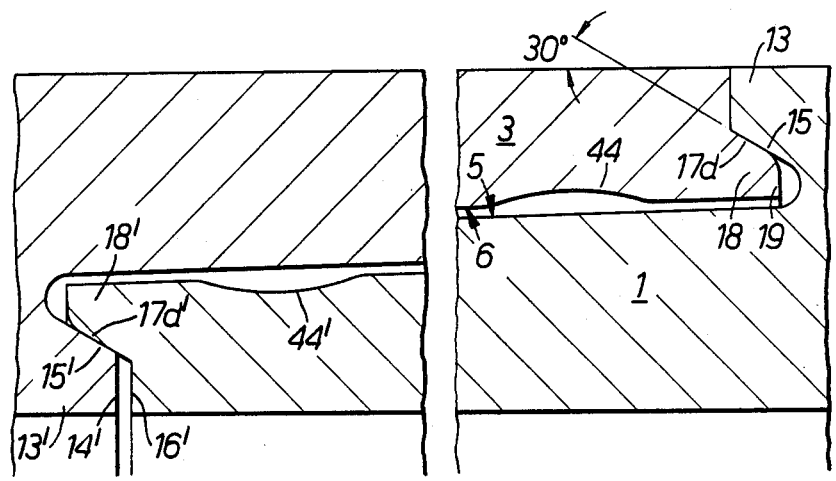

FIGS. 4 to 7 show different shapings of the second surface portions 15,17 of the pin and box members. The configuration shown in FIG. 4 corresponds to that shown in FIGS. 1 to 3, surface portion 15 being frusto-conical with a cone angle of for example about 30°, although it will be appreciated that this angle can be varied as required. Surface portion 17 comprises a radiussed part 17a which contacts surface portion 15 as the members are brought into full engagement. Part 17a merges with a cylindrical surface part 17b and a radial end surface portion 19 which is axially spaced from the corresponding surface of the pin member. In the embodiment of FIG. 5, surface portion 15 has the same configuration as surface portion 15 of FIG. 4 but, in this embodiment, the radiussed part 17a of surface portion 17 merges with a frusto-conical surface part 17c, surface part 17c having a smaller cone angle than surface portion 15, of for example 15°. In the embodiment of FIG. 6 surface portion 17 has the same configuration as in the embodiment of FIG. 4 but surface portion 15 comprises two frusto-conical parts 15a,15b. Part 15a which is initially contacted by surface part 17a as the members are brought together, has a larger cone angle, for example of 45°, than part 15b, which for example has a cone angle of 30°. This shaping of surface portion 15 facilitates engagement of the members since the projection 18 at the free end of the box member carrying surface 17 is less radially constrained, and therefore less deformed, during the last part of its axial movement to the fully engaged condition of the members. In the embodiment of FIG. 7 both surface portions 15 and 17 are frusto-conical with substantially the same cone angle, for example of 30°, surface portion 17 merging with radial surface portion 19 by a radiussed surface part.

The free end of the pin member and the inner end of the box member are advantageously, as shown in FIGS. 1 to 7, also provided with projections 13',18' and first and second end surface portions 14',14',16' and 17' corresponding to the projections 13,18 and surface portions 14,15,16 and 17 at the free end of the box member and the inner end of the pin member. However, at the free end of the pin member, the surfaces 14' and 16' are arranged so that they do not come into contact on full engagement of the members. Surface portions 15' and 17' co-operate in exactly the same way as the corresponding surface portions 15,17 at the free end of the box member and the inner of the pin member.

With the above-described arrangement of the end surface portions 14,15,16 and 17 and 14',15'16' and 17', during the final stages of telescoping of the members together, the surfaces 15,17 and 15',17' come into contact. The radial and axial forces between the surfaces will depend on the relative dimensioning of the members and whether the contacting surfaces are required to provide a seal. When the members are fully engaged together, the surfaces 14,16 are in abutment, and this is visible from the exterior of the connector and can therefore be used as an indication of full engagement of the members. When the members are to be disengaged, pressurised fluid is applied between the surfaces 5,6 and this causes expansion of the box and/or contraction of the pin intermediate the ends of the surfaces 5,6. Expansion of the box member in the region of the ends of the surfaces 5,6 is restricted by the projections 13,13' which also tends to increase the sealing effect provided by contact between the surface portions 15,17 and 15',17'. It will be appreciated that since the projections and grooves in the surfaces 5,6 do not extend to the ends of surfaces 5,6, this restriction provided by projections 13,13' at the ends of the surfaces 5,6 does not prevent the box being expanded and/or the pin contracted sufficient to disengage the projections and grooves. Once the projections have been moved radially out of the grooves, the pin and box members can be moved axially apart. During this initial axial movement, the seals between surface portions 15,17 and 15',17' will be maintained by virtue of the length and shaping of these surfaces while the members are moved axially apart a distance sufficient to bring the crests of the projections to a position where they overlie surfaces between the grooves. It will also be appreciated that the engagement of the surfaces 15,17 and 15',17' during this initial relative radial and axial movement of the members is sufficient to ensure that the members remain circular and concentric.

Figure 8:
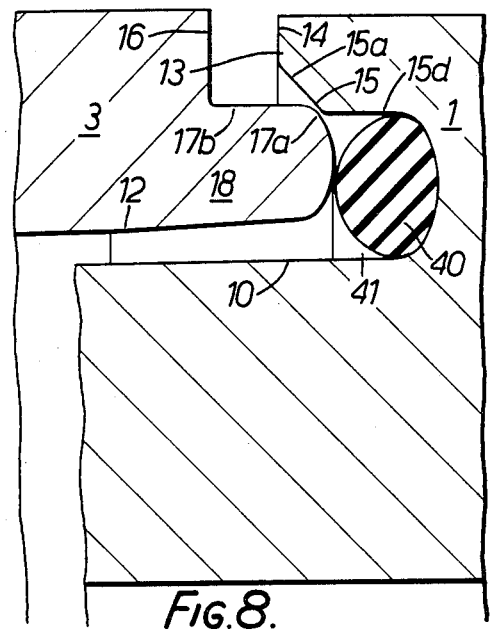
Figure 9:
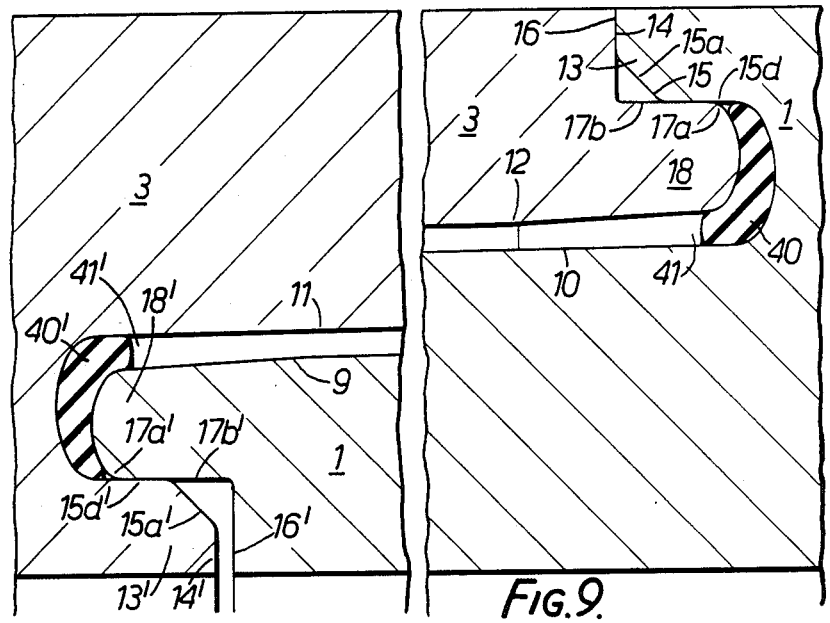

FIGS. 8 and 9 show a further modification of the embodiment of FIG. 6. In this embodiment, surface parts 17a and 17b have the same configuration as surface parts 17a and 17b of FIG. 6 and comprise radiussed part 17a which merges with cylindrical part 17b. In this embodiment surface portion 15 comprises a first part 15a which is generally frusto-conical and, as in the embodiment of FIG. 6, may have a cone angle of about 45°, and a second part 15d which is cylindrical. The diameter of surface part 17b of projection 18 on the box is arranged to be slightly greater than the diameter of surface part 15d on the pin member so that, as the pin and box members are engaged together, surface part 17a will initially contact surface part 15a and, as it slides along surface part 15a projection 18 will flex until surface parts 17b and 15d come into contact. It will be appreciated that, with this embodiment, the radial constraint on, and radial deflection of, the projection 18 can be very precisely controlled by the relative dimensioning of surfaces 17b and 15d and specifically can be reduced to the point where, although there is sufficient sealing between surfaces 17b and 15d when the members are fully engaged together, the axial forces required to bring the members to their fully engaged position is reduced to a minimum.

During disengagement of the members when pressurised fluid is supplied between the peripheral surfaces of the members to expand the box member and/or contract the pin member, during the initial expansion/contraction of the members, surface part 17b is more firmly urged against surface part 15d to increase the sealing effect and is of course firmly retained in a circular confirguation by surface part 15d. Contact between surface parts 17b and 15d is maintained over the initial slight axial movement of the members to bring the crest surfaces of the projections into contact with the surfaces between the grooves and thereafter as further axial movement occurs surface part 17a comes into contact with surface part 15a to maintain the seal between surfaces 15,17.

As with the previous embodiments, in the embodiment of FIGS. 8 and 9, corresponding projections 13',18' with surfaces 14',15',16' and 17' may be provided at the free end of the pin member and the inner end of the box member, surfaces 15',17' co-operating in exactly the same way as surfaces 15 and 17 but, as before, surfaces 14' and 16' do not come into contact.

Figure 10:
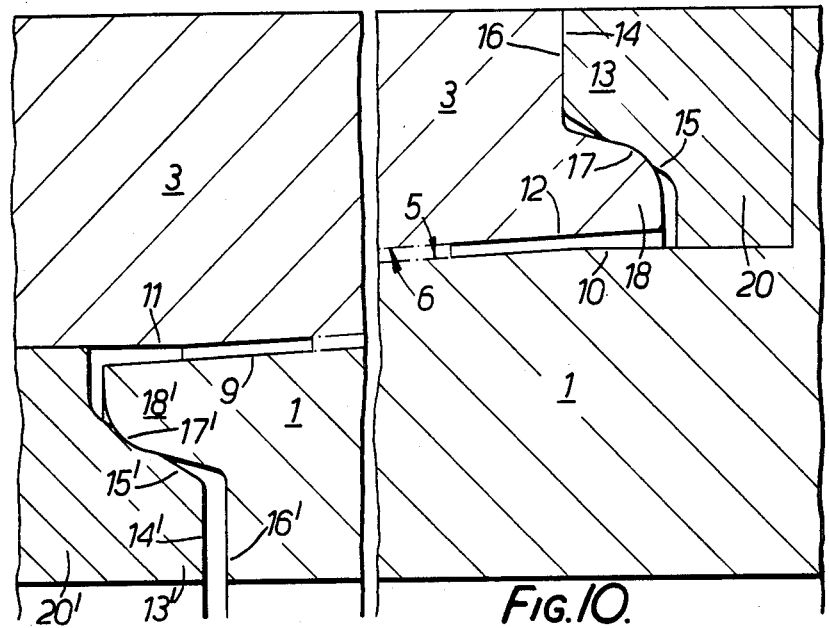

In the above-described embodiments, the projection 13 of the pin member is formed integrally with the body of the pin member. In a modification, shown in FIG. 10, the projection 13 of the pin member is provided by a separate annular element 20 which is then located in a suitably shaped recess at the inner end of the pin member and may, for example, be a shrink fit thereon. Similarly the projection 13' on the box member may also be provided by a separate annular element 20' which is engaged in the box member at the inner end of its peripheral surface 6. Although, as shown in FIG. 10, surfaces 15, 17 correspond to those of the previous embodiment of FIG. 5, it will be appreciated that the modification of this embodiment is applicable to all the previously described embodiments.

To improve the seal between surfaces 15, 17 during disengagement of the members, or to assist in creation of a seal where the surfaces do not seal when the members are fully engaged together, an annular clamp 21, shown diagrammatically in FIG. 3, may be engaged around the pin member in the region of the projection 13 to prevent radially outward flexing of the projection 13. It will be appreciated that this clamp 21 may be used with any of the embodiments described above.

Sealing means may be provided to seal between the two members of the connector in use against internal and external pressures, and to seal the ends of the peripheral surfaces of the members in the initial stages of disengagement of the members, where such seals as may be provided by contact between surface portions 15 and 17 and 15' and 17' are insufficient or the circumstances of use require additional seals. For example, as shown in FIGS. 8 and 9, a resiliently compressible annular seal 40 may be provided in the base of the recess 41 defined between projection 13 and the main body of the pin member, for engagement by the free end of the box member, as shown in FIG. 9. A similar resiliently compressible seal 40' may be provided at the other end of the peripheral surfaces for sealing between the free end of the pin member and the box member. Sealing members 40, 40' may also be provided in any of the embodiments of FIGS. 4 to 7 but, as in the embodiment of FIGS. 8 and 9 it is advantageous to radius the end surface 19 (or 19') of the projection 18 (or 18'), as shown in FIGS. 8 and 9, for improved sealing contact with the seal 40 (or 40').

Figure 11:
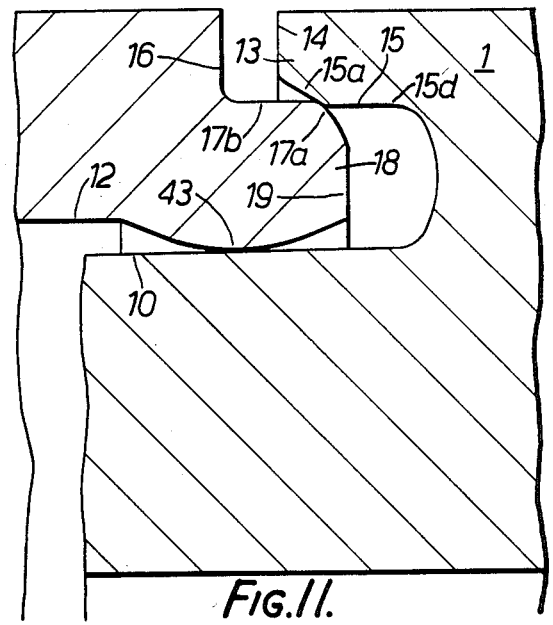

Alternatively, as shown in FIGS. 11 and 12, surface 12 of the box member may, in the region of the projection 18, be provided with a spherical radially inward projection 43 which, when the pin and box members are fully engaged together, as shown in FIG. 12, has an interference fit with surface 10 of the pin member. Surface 10 is cylindrical and, to obtain the interference fit, the minimum diameter of projection 43 at its apex is less than the diameter of surface 10. Contact between projection 43 and surface 10 will of course have an effect on the inter-engagement of surface portions 15 and 17 and will tend to urge these surface portions into contact. Where, as shown in FIGS. 11 and 12, sealing projection 43 is provided in conjunction with surfaces 15, 17 as shown in the embodiment of FIGS. 8 and 9, the diameter of cylindrical surface 17b is preferably less than the diameter of surface 15d but the radial width of the member between surface 17b and the apex of projection 43 is greater than the radial distance between surfaces 10 and 15d, so that surfaces 17b and 15d are urged into contact when the pin and box members are fully engaged together. It will be appreciated that the surface 9 at the free end of the pin member may similarly be provided with a spherical radial projection 43' which makes a force fit engagement with surface 11 at the inner end of the box member.

The embodiment of FIG. 13 corresponds to that shown in FIGS. 11 and 12 except that, in this embodiment, the frusto-concial surfaces 15a and 15a' of FIGS. 11 and 12 have been replaced by radiussed surfaces 15e and 15e'. Radiussing of the surface has the advantage that the axial extent of the portion of the projection 13 or 13' carrying surface 15e or 15e' can be reduced relative to that carrying surface 15a or 15a' so that the axial extents of projection 13 or 13' and annular projection 18 or 18' can be reduced or the axial extent of the contact between surface parts 15d and 17b or 15d' and 17b' can be increased. Surface part 15e or 15e' merges with surface part 15d or 15d' and surface portion 14 or 14' and has a larger radius of curvature than that between surface part 17b or 17b' and surface portion 16 or 16' on the box member to ensure that there is no interference in the region of surface parts 15e and 15e' when the members are fully engaged together. It is found that, in the last stages of engagement of the members where the crests of the projections are being forced over the surfaces between the grooves and adjacent the groove with which the respective projection engages, the pin and box members have to deform radially to permit this in the regions 5 and 6 provided with the projections and grooves. Since the annular projection 18 on the box member is not affected in this way, the radial deformation of the box member has the effect of making the annular projection 18 slightly frusto-conical tapering outwardly of the box member which has the effect of facilitating engagement of the annular projection 18 in the recess between projection 13 and the body of the pin member. This then reduces the need for an extensive lead-in surface (15a, 15e). As shown, a radial seal 43 is provided and the radial dimensions of the annular projection 18 on the box member and surfaces 10 and 15d on the pin members are as described in relation to FIGS. 11 and 12. It will however be appreciated that this shaping of surface part 15e or 15e' is equally applicable to the embodiments of FIGS. 6 and 8 and 9 in which surfaces 15a or 15a' would be replaced by a radiussed surface 15e or 15e'.

In the absence of a seal between surfaces 9, 11 and 10, 12, and where the surfaces are slightly spaced apart when the members are fully engaged together, the radial thickness of the box member may be reduced adjacent the projection 18, as shown for example at 44 in FIG. 7, to assist flexing of projection 18 during engagement and disengagement of the members. It will be appreciated that this feature may be equally applied to the other embodiments described in this application and may be applied to the projection 18' on the free end of the pin member in all the embodiments.

Figure 14:
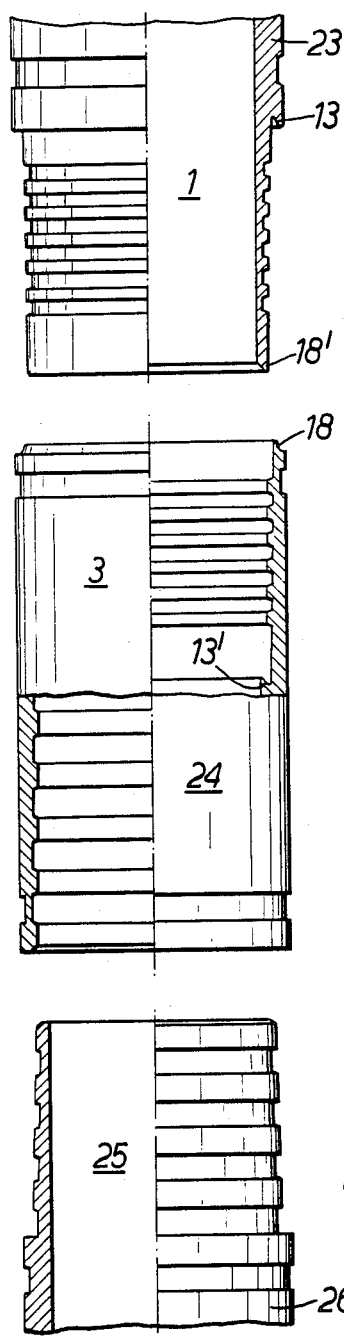
FIG. 14 is a diagrammatic axial section through an embodiment of a connector according to the present invention and illustrating an embodiment of the connection of the pipe connector with pipe sections.

The above-described pin and box members 1, 3 may be formed on the ends of pipe sections so that they are integral therewith, or may be formed separately and fixed directly or indirectly to the pipe sections. Direct fixing may for example be provided by welding the members to the ends of the pipe sections. Indirect fixing may for example be obtained by using the same or other forms of pipe connector to connect the pin and or box member to its pipe section. For example as shown in FIG. 14, a pin member 1 is formed integrally on the end of a pipe section 23 and is engagable with a box member 3. The box member 3 is formed integrally with a box member 24 of a pipe connector as described in the above referred to Patent Specification No. 1573945 which is not intended to be disengagable. Box member 24 is permanently engagable with a pin member 25 which is formed integrally on the end of a pipe section 26. Alternatively the pipe connector comprising box member 24 and pin member 25 may be designed to be disengagable and may for example have the same form as the connector comprising members 1 and 3.

In all the above described embodiments, the surface portions 14, 16 at the inner end of the peripheral surface of the pin member and the free end of the box member, are brought into contact when the members are fully engaged together, the surface portions 14', 16' being axially spaced apart. It will be appreciated that all the above described embodiments may be modified so that surface portions 14', 16' at the inner end of the peripheral surface of the box member and the free end of the pin member, are brought into contact, if required under an axially compressive force, when the members are fully engaged together, and the surface portions 14, 16 are then axially spaced apart.

The members of the above described pipe connectors may, for example, be made of high tensile steel.

What is claimed is:

1. A pipe connector comprising a tubular pin member having a generally frusto-conical outer peripheral surface having an inner axial end and a free outer axial end and a tubular box member having a generally frusto-conical inner peripheral surface having an inner axial end and a free outer axial end, said generally frusto-conical inner peripheral surface of said tubular box member corresponding to said frusto-conical outer peripheral surface of said pin member and overlying said outer peripheral surface of said pin member when the members are fully engaged together, said frusto-conical surfaces being provided with annular projections and grooves which are inter-engaged when said members are fully engaged together to axially lock said members together, wherein one of said members is provided with an annular projection extending around the inner end of said peripheral surface thereof and projecting in the direction of the free end of said one member, said projection having a first end surface portion which extends in a generally radial plane and a second end surface portion which faces said peripheral surface of said one member, wherein said free end of the other of said members has a first end surface portion which extends in a generally radial plane and contacts said first end surface of said projection when said members are fully engaged together and a second end surface portion which faces and laterally contacts said second end surface portion of said projection when said members are fully engaged together, wherein said second surface portions of said members are constructed to be in force-fit abutment when said members are fully engaged together, and wherein said second surface portion of said other member is provided on an annular portion at the free end of said other member and can flex radially during engagement and disengagement of said members.

2. A connector as claimed in claim 1, wherein said one member is said pin member.

3. A connector as claimed in claim 1, wherein said one member is said box member.

4. A connector as claimed in claim 1, wherein said second end surface portion of said one member is generally frusto-conical and inclined in a direction opposite to that of said frusto-conical peripheral surface thereof.

5. A connector as claimed in claim 4, wherein said second end surface portion of said one member comprises a first frusto-conical part and a second frusto-conical part, said first frusto-conical part extending between said second frusto-conical part and said first end surface portion, said second frusto-conical part having a smaller cone angle than said first frusto-conical part.

6. A connector as claimed in claim 1, wherein said second end surface portion of said one member comprises a first frusto-conical part and a second generally cylindrical part, said first frusto-conical part extending between said second part and said first end surface portion.

7. A connector as claimed in claim 1, wherein said second end surface portion of said one member comprises a first radiussed part which merges with a second generally cylindrical part and which extends between said second part and said first end surface portion.

8. A connector as claimed in claim 1, wherein said second end surface portion of said other member comprises a radiussed part which contacts said second end surface portion of said one member as said pin and box members are engaged together.

9. A connector as claimed in claim 4, wherein said second end surface portion of said other member comprises a radiussed part which contacts said second end surface portion of said one member when said pin and box members are fully engaged together.

10. A connector as claimed in claim 5, wherein said second end surface portion of said other member comprises a radiussed part which contacts said second part of said second end surface portion of said one member when said pin and box members are fully engaged together.

11. A connector as claimed in claim 1, wherein said second end surface portion of said other member comprises a cylindrical part which connects said radiussed part to said first end surface portion thereof.

12. A connector as claimed in claim 1, wherein said second end surface portion of said other member comprises a frusto-conical part which connects said radiussed part to said first end surface portion thereof.

13. A connector as claimed in claim 4, wherein said second end surface portion of said other member is generally frusto-conical and has generally the same cone angle as said second end surface portion of said one member.

14. A connector as claimed in claim 1, wherein in the region of said annular portion of said other member, the radial thickness of said other member is reduced to facilitate flexing of said annular portion.

15. A connector as claimed in claim 1, wherein in the region of said first and second end surface portions of said members, the peripheral surfaces of said members are free of projections and grooves and are radially spaced apart when said members are fully engaged together.

16. A connector as claimed in claim 1, including sealing means for sealing between said members, said sealing means comprising a resiliently compressible annular member arranged in the recess between said projection of said one member and the body of said one member and engagable by the free end of said other member when said members are fully engaged together.

17. A connector as claimed in claim 1, including sealing means for sealing between said members, said sealing means comprising an annular radial projection on said peripheral surface of one of said members in the region of said first and second end surfaces thereof for force fit engagement with said peripheral surface of the other one of said members.

18. A connector as claimed in claim 17, wherein said annular radial projection is provided on said peripheral surface of said other member in the region of said second end surface portion thereof and causes said second end surface portion thereof to be urged into contact with said second end surface portion on said one member.

19. A connector as claimed in claim 1, wherein a projection corresponding to said projection on said one member is provided at the inner end of said peripheral surface of said other member and has a second end portion corresponding to said second end surface portion of the one member, and said free end of said one member is provided with a second end surface portion corresponding to said second end surface portion on said free end of said other member, said projection on said other member and said free end of said one member are provided with first end surface portions corresponding to said first end surface portions provided on said one member and on said free end of said other member but which are not brought into contact when said members are fully engaged together.

20. A connector as claimed in claim 19, including sealing means for sealing between said members, said sealing means comprising resiliently compressible annular members arranged in recesses between said projection on said members and the bodies of said members for engagement by said free ends of said members.

21. A connector as claimed in claim 19, including sealing means for sealing between said members, said sealing means comprising an annular radial projection on said peripheral surface of each member adjacent said free end of each member for force fit engagement with said peripheral surface of the other one of said members.

22. A connector as claimed in claim 1, wherein said second end surface portion of said projection of said one member lies between said first end surface portion of said projection and said peripheral surface thereof.

23. A pipe connector comprising a tubular pin member having a generally frusto-conical outer peripheral surface having an inner axial end and a free outer axial end and a tubular box member having a generally frusto-conical inner peripheral surface having an inner axial end and a free outer axial end, said generally frusto-conical inner peripheral surface of said tubular box member corresponding to said frusto-conical outer peripheral surface of said pin member and overlying said outer peripheral surface of said pin member when the members are fully engaged together, said frusto-conical surfaces being provided with annular projections and grooves which are inter-engaged when said members are fully engaged together to axially lock said members together, wherein one of said members is provided with an annular projection extending about the inner end of said peripheral surface thereof and projecting in the direction of the free end of said one member, said projection having a first end surface portion which extends in a generally radial plane and a second end surface portion which faces said peripheral surface thereof and which comprises a generally cylindrical surface part, and wherein said free end of said other one of said members has a first end surface portion which extends in a generally radial plane and contacts said first end surface of said projection when said members are fully engaged together and a second end surface portion comprising a generally cylindrical part which faces and laterally contacts said generally cylindrical part of said second end surface portion of said projection when said members are fully engaged together, the diameter of said generally cylindrical part of said second surface portion of said box member being greater than the diameter of said generally cylindrical part of said second surface portion of said pin member such that when said members are fully engaged together there will be a force-fit sealing contact between the cylindrical parts of said second surface portions of said members.

24. A connector as claimed in claim 23, wherein said second end surface portion of said projection includes a generally frusto-conical part connecting said cylindrical part to said first end surface portion thereof.

25. A connector as claimed in claim 24, wherein said second end surface portion of said other member comprises a radiussed part which contacts said frusto-conical part of said second end surface portion of said projection as said members are engaged together.

26. A connector as claimed in claim 23, wherein said second end surface portion of said projection comprises a radiussed part which connects said cylindrical part to said first end surface portion.

27. A connector as claimed in claim 26, wherein said second end surface portion of said other member comprises a radiussed part which contacts said radiussed part of said second end surface portion of said projection as said members are engaged together.

28. A connector as claimed in claim 1, wherein said first end surface portions of said members are arranged to be in force fit abutment when said members are fully engaged together.

29. A connector as claimed in claim 23, wherein said second end surface portion of said projection of said one member lies between said first end surface portion of said projection and said peripheral surface thereof.

30. A pipe connector comprising a tubular pin member having a generally frusto-conical outer peripheral surface having an inner axial end and a free outer axial end and a tubular box member having a generally frusto-conical inner peripheral surface having an inner axial end and a free outer axial end, said generally frusto-conical inner peripheral surface of said tubular box member corresponding to said frusto-conical outer peripheral surface of said pin member and overlying said outer peripheral surface of said pin member when the members are fully engaged together, said frusto-conical surfaces being provided with annular projections and grooves which are inter-engaged when said members are fully engaged together to axially lock said members together, wherein one of said members is provided with an annular projection extending about the inner end of said peripheral surface thereof and projecting in the direction of the free end of said one member, said projection having a first annular end surface portion which extends in a generally radial plane and a second annular end surface portion which generally faces said peripheral surface thereof, wherein said free end of the other of said members has a first annular end surface portion which extends in a generally radial plane and contacts said first end surface of said projection when said members are fully engaged together and a second annular end surface portion which faces and laterally contacts said second end surface portion of said projection when said members are fully engaged together, and wherein sealing means are provided for sealing between said members, said sealing means comprising a resiliently compressible annular member arranged in a recess defined between said projection of said one member and said body of said one member and engageable by the free end of said other member when said members are fully engaged together.

31. A connector as claimed in claim 30, wherein said second end surface portion of said projection of said one member lies between said first end surface portion of said projection and said peripheral surface thereof.

32. A pipe connector comprising a tubular pin member having a generally frusto-conical outer peripheral surface having an inner axial end and a free outer axial end and a tubular box member having a generally frusto-conical inner peripheral surface having an inner axial end and a free outer axial end, said generally frusto-conical inner peripheral surface of said tubular box member corresponding to said frusto-conical outer peripheral surface of said pin member and overlying said outer peripheral surface of said pin member when the members are fully engaged together, said frusto-conical surfaces being provided with annular projections and grooves which are inter-engaged when said members are fully engaged together to axially lock said members together, wherein one of said members is provided with an annular projection surrounding the inner end of said peripheral surface thereof and projecting in the direction of the free end of said one member, said projection having a first annular end surface portion which extends in a generally radial plane and a second annular end surface portion which generally faces said peripheral surface thereof, wherein said free end of the other one of said members has a first annular end surface portion which extends in a generally radial plane and contacts said first end surface of said projection when said members are fully engaged together and a second annular end surface portion which faces and laterally contacts said second end surface portion of said projection when said members are fully engaged together, and wherein sealing means are provided for sealing between said members, said sealing means comprising an annular radial projection on said peripheral surface of said other member in the region of said second surfaces thereof for force fit engagement with a part of said peripheral surface of said one member.

33. A connector as claimed in claim 1, wherein said one member is said pin member and radially outer edges of said first surface portions of said members are visible externally of said connector.

34. A connector as claimed in claim 32, wherein said second end surface portion of said projection of said one member lies between said first end surface portion of said projection and said peripheral surface thereof.

35. A pipe connector comprising a tubular pin member having a generally frusto-conical outer peripheral surface having an inner axial end and a free outer axial end and a tubular box member having a generally frusto-conical inner peripheral surface having an inner axial end and a free outer axial end, said generally frusto-conical inner peripheral surface of said tubular box member corresponding to said frusto-conical outer peripheral surface of said pin member and overlying said outer peripheral surface of said pin member when the members are fully engaged together, said frusto-conical surfaces being provided with annular projections and grooves which are inter-engaged when said members are fully engaged together to axially lock said members together, wherein each of said members is provided with an annular projection extending about the inner end of said peripheral surface thereof and projecting in the direction of the free end of the respective member, said projection on said pin member having a first annular radially outer end surface portion which extends in a generally radial plane and a second annular radially inner generally radially inwardly directed end surface portion, said free end of said box member having a first radially outer end surface portion which extends in a generally radial plane and faces said first surface portion of said projection of said pin member when said members are fully engaged together, and a second radially inner generally radially outwardly directed end surface portion which laterally contacts said second end portion of said projection of said pin member when said members are fully engaged together, said projection on said box member having a first annular radially inner end surface portion which extends in a generally radial plane and a second annular radially outer generally radially outwardly directed end surface portion, said free end of said pin member having a first radially inner end surface portion which extends in a generally radial plane and faces said first surface portion of said projection of said box member when said members are fully engaged together, and a second radially outer generally radially inwardly directed end surface portion which laterally contacts said second end surface portion of said projection of said box member when said members are fully engaged together.

36. A connector as claimed in claim 35, wherein one of the pairs of facing first end surface portions are in contact when the members are fully engaged together, the surface portions of the other pair of first end surface portions being axially spaced apart.

37. A connector as claimed in claim 36, wherein the first end surface portion on the free end of the box member contacts the first surface portion of the projection of the pin member when the members are fully engaged together.

38. A connector as claimed in claim 36, wherein the said one pair of first end surface portions is in abutment under a compressive force when the members are fully engaged together.

39. A pipe connector comprising a tubular pin member having a generally frusto-conical outer peripheral surface having an inner axial end and a free outer axial end and a tubular box member having a generally frusto-conical inner peripheral surface having an inner axial end and a free outer axial end, said generally frusto-conical inner peripheral surface of said tubular box member corresponding to said frusto-conical outer peripheral surface of said pin member and overlying said outer peripheral surface of said pin member when the members are fully engaged together, said frusto-conical surfaces being provided with annular projections and grooves which are inter-engaged when said members are fully engaged together to axially lock said members together, wherein one of said members is provided with an annular projection extending around the inner end of said peripheral surface thereof and projecting in the direction of the free end of said one member, and, in the region of said projection, said one member is provided with a first surface portion which extends in a generally radial plane, said projection having a second surface portion which faces said peripheral surface of said one member, said free end of the other of said members having a first surface portion which extends in a generally radial plane and contacts said first surface portion of said one member when said members are fully engaged together, and a second surface portion which faces and laterally contacts said second surface portion of said projection when said members are fully engaged together, said second surface portions comprising cylindrical parts which are brought into force-fit sealing contact when said members are fully engaged together, and wherein said peripheral surfaces of said members in the regions of said second surface portions are free of said inter-engageable projections and grooves, an annular radial projection is provided on the peripheral surface of said other member in the region of the second surface portion thereof which, when the members are fully engaged together, makes sealing contact with a part of said peripheral surface of said one member which is cylindrical, and the radial distance between said cylindrical part of said peripheral surface of said one member and said cylindrical part of said second surface portion thereof is less than the radial distance between the crest of said radial projection on said other member and said cylindrical part of said second surface portion thereof when said members are in an unstressed condition before inter-engagement thereof.

* * * * *